(12) United States Patent
Schwab

(10) Patent No.: US 8,383,073 B2
(45) Date of Patent: Feb. 26, 2013

(54) METHOD AND APPARATUS FOR CONTROLLING ACID GAS EMISSIONS FROM CEMENT PLANTS

(75) Inventor: James J. Schwab, Napa, CA (US)

(73) Assignee: Envirocare International Inc., American Canyon, CA (US)

( * ) Notice: Subject to any disclaimer, the term of this patent is extended or adjusted under 35 U.S.C. 154(b) by 0 days.

(21) Appl. No.: 13/160,391

(22) Filed: Jun. 14, 2011

(65) Prior Publication Data

US 2012/0039778 A1 Feb. 16, 2012

Related U.S. Application Data

(62) Division of application No. 12/343,879, filed on Dec. 24, 2008, now Pat. No. 8,003,057.

(51) Int. Cl.
*B01D 53/40* (2006.01)
*C01F 11/02* (2006.01)
(52) U.S. Cl. ......... 423/230; 423/220; 423/225; 423/635
(58) Field of Classification Search .................. 423/220, 423/230, 635, 225
See application file for complete search history.

(56) References Cited

U.S. PATENT DOCUMENTS

| 5,814,288 A | 9/1998 | Madden et al. |
| 7,279,039 B2 * | 10/2007 | Schwab et al. ................. 106/752 |
| 8,003,057 B2 | 8/2011 | Schwab |

* cited by examiner

*Primary Examiner* — Daniel C McCracken
*Assistant Examiner* — Daniel Berns
(74) *Attorney, Agent, or Firm* — Kilpatrick Townsend & Stockton LLP

(57) ABSTRACT

A method and apparatus for controlling emissions of acid forming gases such as sulfur dioxide from cement plants is disclosed. Gaseous effluent from the cement plant pyroprocessing chamber is routed to the plant's raw mill to heat and dry the feed meal used in cement production. When the raw mill is in operation microfine lime particles are sprayed into the raw mill using a nozzle system. The spraying of hydrated lime into the raw mill scrubs acid forming gases in the process gaseous effluent. When the raw mill is not operational, microfine lime is sprayed into a gas conditioning tower that is also used to reduce the temperature of the effluent gases to facilitate efficient collection of dust particles prior to emission of the cleansed effluent flow into the atmosphere.

11 Claims, 4 Drawing Sheets

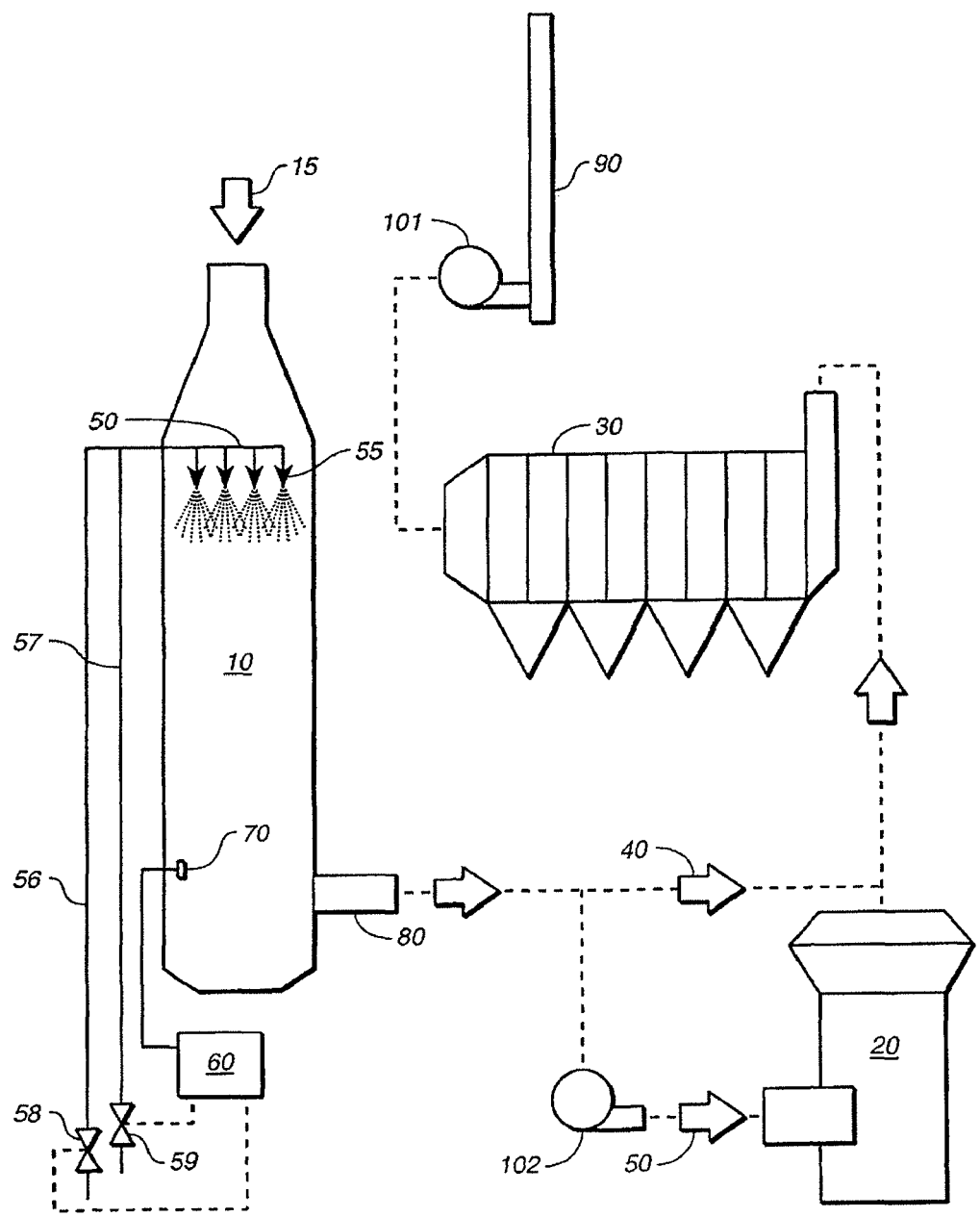
FIG._2
(PRIOR ART)

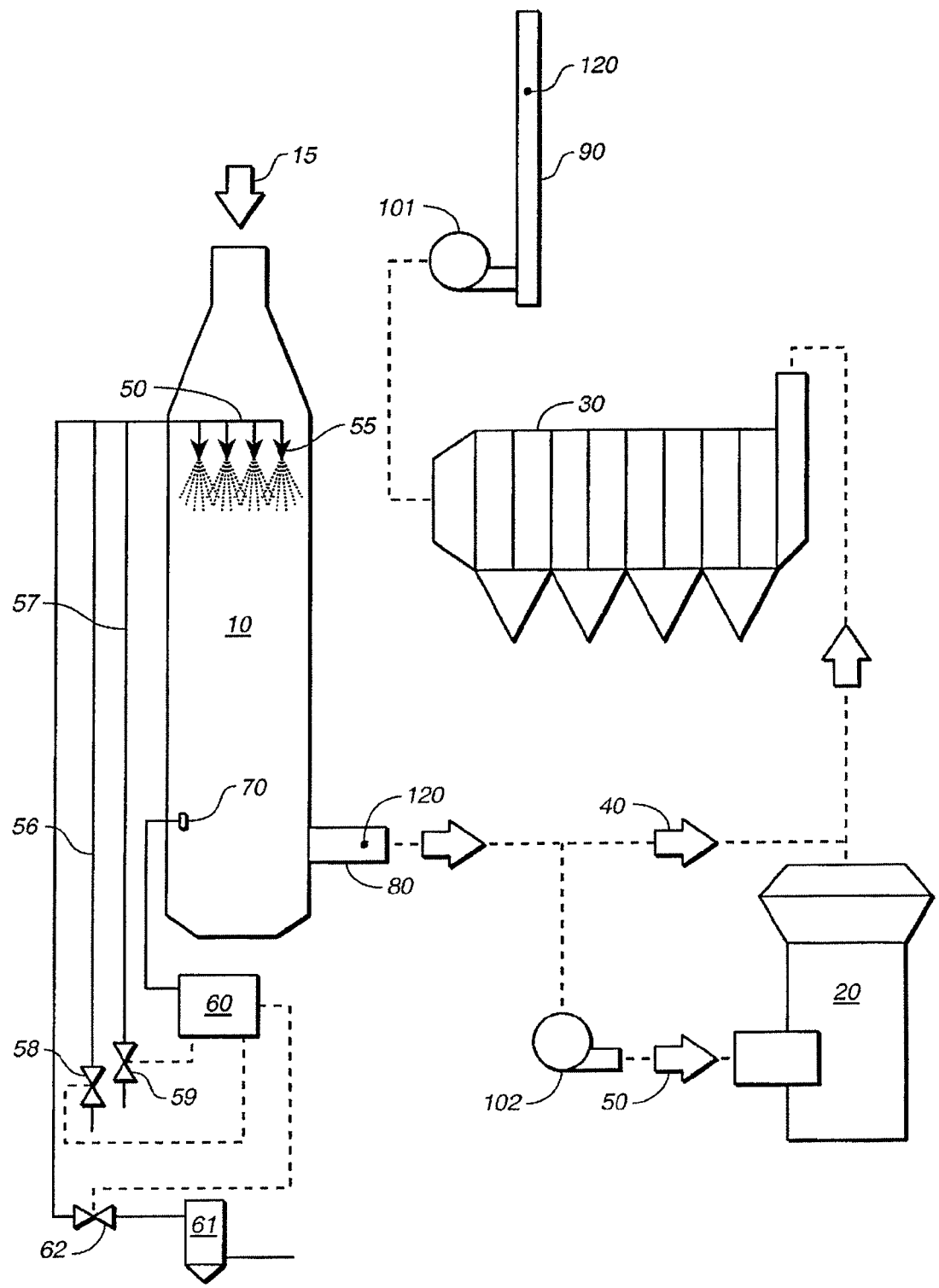
FIG._3
(PRIOR ART)

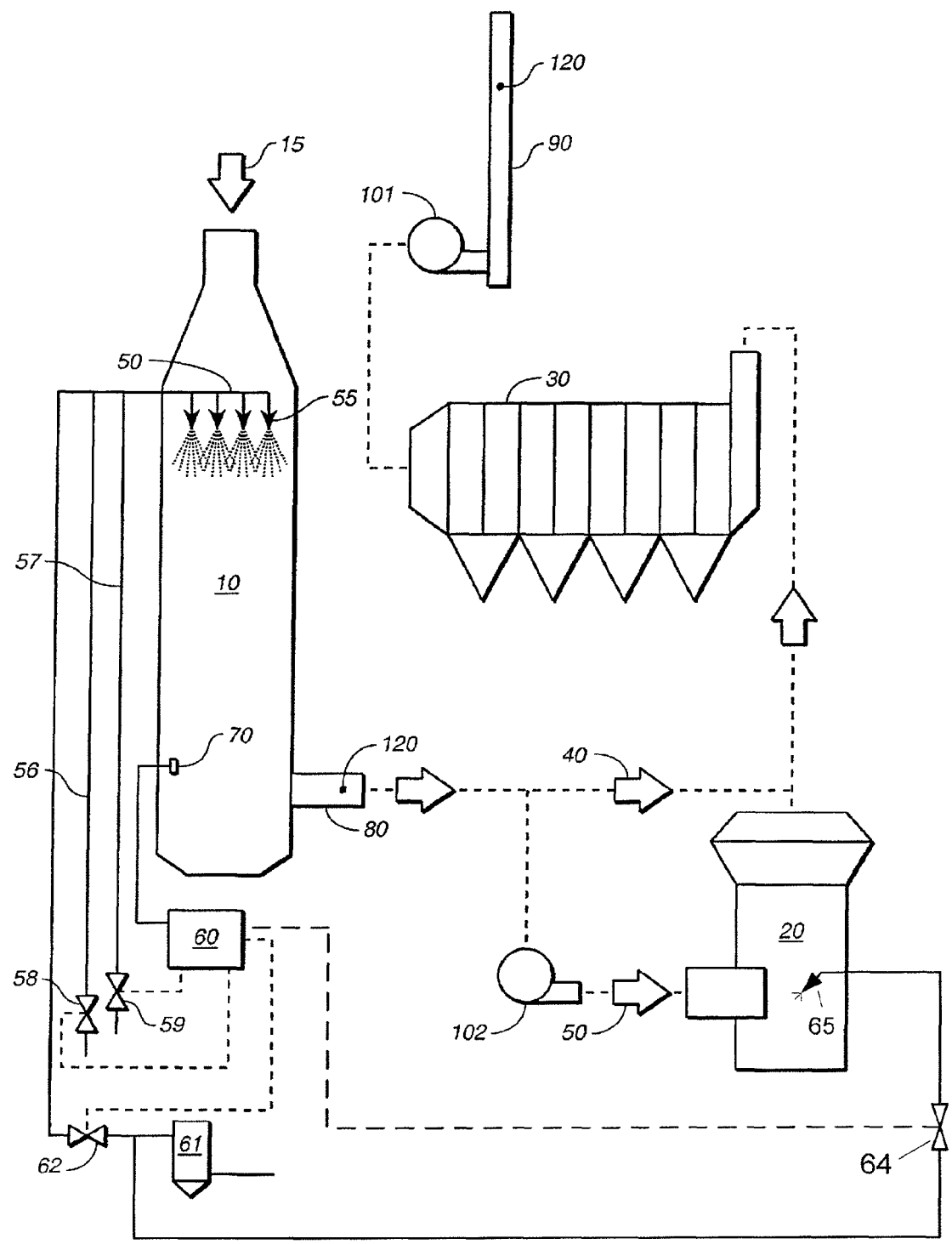
FIG._4

METHOD AND APPARATUS FOR CONTROLLING ACID GAS EMISSIONS FROM CEMENT PLANTS

CROSS-REFERENCE TO RELATED APPLICATIONS

This application is a divisional of U.S. patent application Ser. No. 12/343,879, filed on Dec. 24, 2008, the entirety of which is incorporated by reference herein.

BACKGROUND OF THE INVENTION

1. Field of the Invention

The present invention relates to methods and apparatus for pollution control, and is particularly directed to controlling atmospheric emissions from cement plants.

2. Background

Over the past several decades air pollution control has been a priority concern of society. In the United States primary regulatory authority over industrial source air emissions resides in the U.S. Environmental Protection Agency ("EPA"). Over the years, the EPA has increased the stringency of its air pollution control programs, both by decreasing the limits on acceptable emissions and by continually increasing the number and types of regulated pollutants. The regulatory approach has been to require sources of air pollution to adopt the best available control technologies ("BACT"). In some instances, particularly where potentially toxic compounds are released into the atmosphere, sources are required to use the maximum available control technology ("MACT").

The foregoing control programs are applicable to cement manufacturing facilities, including those which use a raw mill to grind the raw materials ("feed meal") before it is fed into a pyroprocessing kiln. Two well known types of devices to remove common particulates from the gaseous effluent stream of a cement plant are electrostatic precipitators (ESPs) and fabric filter baghouse (FFB) collectors. ESPs are generally recognized as being capable of a high particle collection efficiency of fine particles when the particles have the proper electrical resistivity. FFBs are also generally recognized as being capable of a high particle collection efficiency of fine particles when the particles have the proper characteristics. Typically, the effluent gas stream is "conditioned" prior to discharge such that the particulates can be more efficiently filtered by ESPs or FFBs. However, ESPs and FFBs are designed to remove particulates and do not remove many gaseous pollutants. Certain species of acid-forming gases can penetrate conventional particulate collection devices such as ESPs or FFBs resulting in emissions violations, causing downstream corrosion of components, and contributing to visible condensed particles which form after exiting the stack. In particular, ESPs and FFBs do not remove sulfur dioxide and other gases that form acids when dissolved in water.

The release of acid-forming gases from a cement plant may violate pollution control standards, may contribute to the "detached plume" phenomena and may contribute to acid rain. Acid forming gases are now known to contribute to the formation of visible plumes of effluent that violate opacity regulations even when the total quantity of acid forming gases released into the atmosphere is comparatively minor. For example, one air pollution control problem for cement plants is the formation of a detached plume. Experimental studies have identified the detached plumes as being comprised primarily of ammonium sulfate and ammonium chloride particulates that form and condense as the emissions from the stack cool in the atmosphere a distance from the stack. The ammonium particulates are in a size range of approximately one micron, which is a size that is efficient at scattering and reflecting light. The small size of the particulates and their high scattering efficiency means that an optically opaque plume can be comprised of a comparatively small total mass of ammonium sulfate and ammonium chloride particulates. These detached plumes consist of a white plume of fine particles that may last for hours or days depending on plant and atmospheric conditions. The plumes are highly noticeable and may violate pollution control regulations for opacity, and are considered a potentially serious problem.

One solution to this problem would be to add a wet chemical scrubber immediately after the ESP or FFB. However, conventional methods to scrub acid forming gases are typically expensive and inconsistent with the economic operation of an energy efficient cement plant. For example, conventional wet scrubbers, which commonly use spray droplet sizes greater than 1000 microns, typically use 10-100 gallons per minute of scrubbing liquid to scrub 1000 standard cubic feet per minute of effluent gases (1-10 kilograms of liquid per kilogram of gas). Consequently, the consumption of water, scrubbing chemicals, and energy would be quite large for a conventional liquid scrubber.

The hot cement kiln gases must be cooled to approximately 150° C. to have acceptable particulate emissions from an ESP or cooled to approximately 180° C. to protect a FFB from overheating. Modern cement plants commonly use two methods to cool and condition hot process gases before they enter an ESP or FFB. A gas conditioning tower ("GCT") uses a spray of water to cool and condition the gaseous effluent. Further cooling and conditioning may then be performed by passing the gaseous effluent through the cool wet limestone of a raw mill that is used to grind the raw materials into a "feed meal," which is then transported to the pyroprocessing kiln. However, cooling in the raw mill only occurs when the raw mill is operational. When the raw mill is on, the gas conditioning tower typically must only cool the gaseous effluent to around 250° C. After it leaves the GCT, in the mill-on state, the effluent is then further cooled to between 90° C. and 140° C. as it passes through the raw mill. However, when the raw mill is off, the cooling tower must provide all of the necessary cooling. There are thus two distinct operational states of the cement plant, corresponding to a mill-on and a mill-off condition.

One prior art solution to the problem of sulfur dioxide emissions from a cement plant, as disclosed in the inventor's prior U.S. Pat. No. 6,464,952, the disclosure of which is incorporated by reference, is to inject a high-pH lime slurry into the spray used in the GCT. As described therein, while other high pH materials can be used, a lime slurry is a desirable scrubbing material because lime is chemically compatible with other chemical constituents of cement, i.e., the cement will not be deleteriously contaminated if small quantities of lime enter the feed meal subsequent to the GCT. The lime slurry reacts with sulfur dioxide and other acid forming gases to produce thermally stable salts, thereby reducing emissions of acid forming gases.

Nonetheless further methods and apparatuses for reducing acid forming gases to be efficiently and economically scrubbed are desired.

SUMMARY OF THE INVENTION

In one embodiment, the present invention is directed to a method of controlling emissions of acid forming gases from a pyroprocessing cement plant having a raw mill for processing feed meal used in cement production and a gas conditioning tower, wherein effluent gases from cement production are routed through the gas conditioning tower and to the raw mill to heat the feed meal, comprising, spraying microfine hydrated lime into the gas flow after it has passed through the gas conditioning tower when the raw mill is in operation. The spray may be a water-based slurry injected into the raw mill or a dry powder. A water-based slurry of microfine hydrated lime may be injected into the gaseous effluent in the gas conditioning tower when the raw mill is not in operation, and also when the raw mill is in operation. The spray of water-based slurry may be created using a two-fluid nozzle. Preferably, the microfine lime consists substantially of particles having a mean diameter of about 10 microns or less. The water-based slurry may comprise about 25% by weight of hydrated microfine lime. Alternatively dry powdered microfine lime may sprayed into the raw mill or into the gas flow upstream of the raw mill and downstream of the gas conditioning tower.

In another aspect the present invention is directed to an apparatus for reducing the amount of at least one acid gas forming substance in the effluent gas from a cement plant, comprising a pyroprocessing chamber for producing cement clinker from feed meal, wherein a high temperature is maintained in the pyroprocessing chamber using a combustion process that creates hot effluent gases, a raw mill for grinding raw materials into feed meal, an effluent gas flow structure for routing the hot effluent gases from the pyroprocessing chamber to said raw mill while the raw mill is in operation, and a nozzle system within the raw mill for spraying microfine lime into the raw mill. The apparatus preferably further comprises a gas conditioning tower for conditioning the hot effluent gas flow, wherein the gas conditioning tower comprises a nozzle system for spraying a cooling liquid into effluent gas flow, wherein the nozzle system is adapted to spray a slurry of microfine lime into the effluent gas flow. Preferably, the nozzle system comprises at least one two-fluid nozzle. The cement plant preferably also comprises a dust collector downstream of the raw mill for removing particulate matter from the effluent gas flow before it is discharged into the atmosphere. The nozzle system is preferably operationally connected to a control system. The apparatus may further include an in-line wet grinder for producing the microfine hydrated lime.

In another aspect the present invention is directed to a method of controlling acid gas emissions from a cement plant having a raw mill for grinding raw materials to produce a feed meal used in cement production, a pyroprocessing chamber for processing the feed meal at high temperature, and a gas conditioning tower, and wherein effluent gases from the pyroprocessing chamber are routed through the raw mill to heat and dry the feed meal when the raw mill is in operation, and wherein the effluent gases are also routed through the gas conditioning tower, comprising, spraying microfine lime into the raw mill when it is in operation, spraying microfine lime into the gas conditioning tower when the raw mill is not in operation, and removing dust from the effluent gas stream downstream of the gas conditioning tower and the raw mill prior to discharging the gaseous effluent into the atmosphere.

These and other aspects and objectives of the present invention will become clear to those skilled in the art in reference to the drawings and accompanying specification.

BRIEF DESCRIPTION OF THE DRAWINGS

FIG. 2 is a schematic representation of an embodiment of a prior art pollution control system used in a cement plant of the type shown in FIG. 1.

FIG. 3 is a schematic representation of another embodiment of a prior art pollution control system used in a cement plant of the type shown in FIG. 1.

FIG. 4 is a schematic representation of an embodiment of a pollution control system used in a cement plant of the type shown in FIG. 1 in accordance with the present invention.

DETAILED DESCRIPTION OF PREFERRED EMBODIMENT

Figure 1:
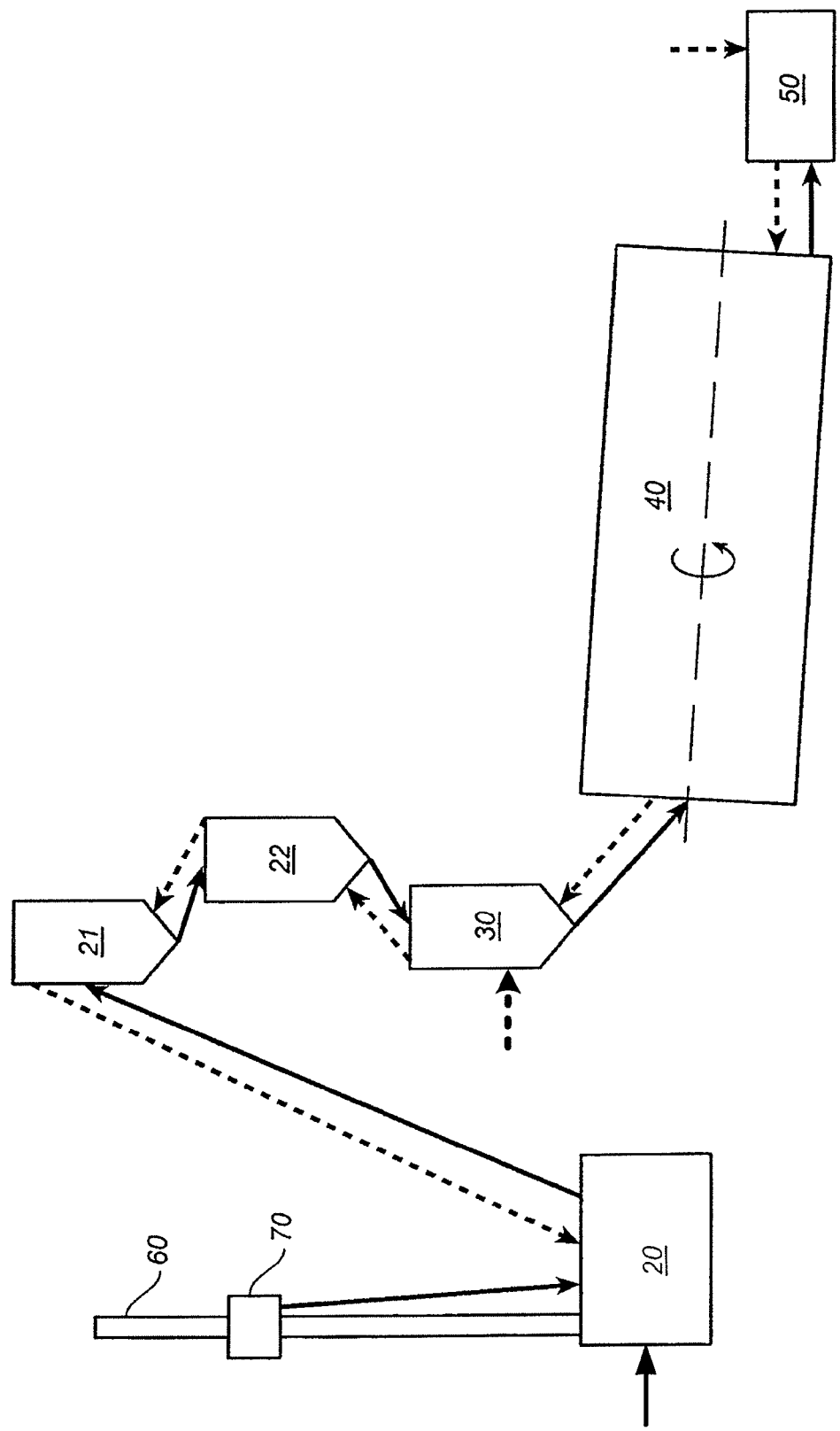
FIG. 1 is a schematic representation of the gas and solid flows in a typical prior art pyroprocessing cement plant.

A typical modern cement manufacturing facility is shown in FIG. 1. While other dry and wet cement manufacturing processes are known, the dry, precalciner process depicted in FIG. 1 is now the most common and efficient. The primary feed material, comprising a calcium-containing mineral used in manufacturing the cement, is obtained from a quarry, usually located nearby the cement plant. Typically the primary feed material is limestone, to which smaller quantities of sand, clay, shale, and/or bauxite are added. It has also become common to use industrial waste products, such as fly ash or slag, as feed materials. The feed materials provide the calcium, silica, aluminum and iron necessary to produce cement. The quarried material is reduced in size by a crusher (not shown), and the crushed raw material is then transported to the cement plant, for example by motor or rail vehicle or by conveyor (also not shown). The proper proportions of the raw materials are then mixed and further reduced in size in a raw mill 20 to form a feed meal.

In operation raw mill 20 continuously classifies the materials being processed using well-known cyclonic separation techniques. Large diameter materials are retained for further grinding while smaller, properly sized particles are sent on for further processing as described below. Very fine dust particles become entrained in the gas flow and are removed by the ESP or FFB. In addition, a small amount of water is typically added in the raw mill to act as a grinding aid or lubricant.

The feed meal from raw mill 20 is then transported to and preheated in a preheating tower, comprising a series of vertically stacked cyclone chambers using exhaust gas from the kiln. While two such cyclone chambers (21, 22) are shown in FIG. 1, more (typically 3 or 4) may be used. Collectively these are referred to herein as the preheating tower and includes a precalciner 30. As depicted in FIG. 1, feed meal from raw mill 20 enters at the top of the preheating tower 21 and is preheated as it descends under the force of gravity. The heated feed meal is then introduced into a precalciner 30, which converts the calcium carbonate ($CaCO_3$) in the limestone (or other feed material) into calcium oxide (CaO), releasing a large amount of carbon dioxide ($CO_2$) in the process. This is accomplished by heating the feed meal to high temperature—between about 1,650° F. (900° C.) and 1,800° F. (982° C.). The required temperature is higher than the temperature of the kiln exhaust gases, and so typically additional heat is generated in the precalciner by combustion of auxiliary fuel.

After precalcination the feed meal is introduced into a large rotary pyroprocessing kiln 40 where it is heated to a temperature of about 2,700° F. (1,480° C.) to form "clinker," consisting primarily of calcium silicates. Rotary kiln 40, which may be as long as 700 feet (213 meters), is substantially horizontal, with a slight tilt sufficient for gravity-assisted transport of the materials undergoing pyroprocessing along its length. Various fuels may be used to support combustion within the kiln in order to achieve the high processing temperature that is required. The hot clinker is then discharged from the kiln into a cooling chamber 50. After being cooled, the clinker is discharged from cooling chamber 50 and ground into fine particles. Normally, a small amount of gypsum is added during this final process stage.

The air used for combustion in kiln 40 first flows through cooling chamber 50, where it gains heat as it cools the clinker. The hot exhaust gases from kiln 40 flow through the precalciner 30 and then to the preheating tower 21 as described. After combustion in the kiln very little oxygen remains in the exhaust gas flow, and so additional air is introduced into precalciner 30 to support combustion. After passing through preheating tower 21, the exhaust gases are routed through a gas conditioning tower ("GCT"—not shown in FIG. 1) and then to raw mill 20 used to grind the raw feed materials, before being discharged into the atmosphere via stack 60. Because of the high particulate load, a baghouse or electrostatic precipitator 70 is used to remove particles from the gas flow, which are typically recycled back into and blended with the feed meal. As described above, the GCT is included to reduce the effluent gas temperature, as needed, as shown and discussed in connection with the remaining figures.

Cement plants are advantageously designed for maximum efficiency to make optimal use of thermal energy. Gases are routed through the plant so as to use and recapture as much of the heat as possible. Accordingly, those skilled in the art will appreciate the desirability of optimizing the physical layout to minimize heat losses as the materials travel between the various processing stations in the system. Specifically, exhaust gases from kiln 40 are used to preheat and dry the feed meal before pyroprocessing. In FIG. 1 the movement of the solids (i.e., the feed meal, clinker, etc.) between the various processing operations is shown by solid lines, while the flow of gases is shown with dashed lines. It can thus be seen that the gas flow through the process is generally counter to the flow of the solids and, from the time the gases leave the kiln to the time they are exhausted into the atmosphere, they exchange heat with the feed meal, i.e., the gases are cooled as the feed meal is dried and heated. Thus, for example, the feed meal is progressively heated as it travels down the preheating tower from one preheating cyclone to the next, while the flue gases become successively cooler as they travel up the tower.

FIG. 2 is representative of a pollution control system used in a modern, energy-efficient cement plant with an ESP for meeting stringent air pollution control regulations for particle emissions. As shown in FIG. 2, hot gases from a preheater tower (not shown in FIG. 2) enter GCT 10. (The gas flow entering GCT 10 is shown schematically by flow arrow 15.) Gases entering the GCT may be as hot as 400° C. A nozzle system 50 located near the entrance of GCT 10 injects a spray of cooling liquid into the hot gas flow in the tower. As depicted, nozzle system 50 preferably comprises a plurality of individual nozzles 55, in order to ensure that the injected spray is evenly distributed into the gas flow, thereby promoting uniform cooling. Preferably, individual nozzles 55 are two-fluid nozzles connected by supply pipes 56 and 57 to a source of water and compressed air, respectively. The flow of water and air to the nozzles is modulated by valves 58 and 59, respectively. Valves 58 and 59 are controlled by logic and control system 60 to maintain a spray of desired characteristics. Logic and control system 60 preferably is also used to monitor various system parameters and to adjust the spray as conditions change. A temperature sensor 70 may be placed near the exit of GCT 10 to monitor the temperature of the gas flow leaving the GCT. Logic and control system 60 uses the information from the temperature sensor 70 to determine whether the temperature leaving GCT 10 is within a desired target range. If the temperature is outside of the target range, logic and control system 60 responds by adjusting the spray accordingly. Other sensors may also be employed and connected to the logic and control system, such as a sensor (not shown) for measuring the temperature of gases flowing into GCT 10.

Gases exit GCT 10 via outlet 80 preferably flow into a raw feed mill 20 to help dry and preheat the feed meal used in the cement plant, and then on to electrostatic precipitator (ESP) 30. However, during a raw mill upset or when the raw mill is not in operation, gases flow directly from GCT 10 to ESP 30 as shown by flow arrow 40. After leaving ESP 30, the gases are exhausted into the atmosphere via stack 90. The gases are propelled through the air pollution control system using fans 101 and 102.

While the pollution control system of FIG. 2 is an example of a modern pollution control system that is effective at removing common particulates, it does not address the problem of reducing the concentrations of acidic forming gases in the effluent gas stream, such as sulfur dioxide and hydrogen chloride.

FIG. 3 shows an improved version of the pollution control system of FIG. 2, as disclosed in the inventor's U.S. Pat. No. 6,464,952, the disclosure of which is incorporated by reference. Specifically, FIG. 3 shows a pollution control system, as previously described, with a lime slurry source 61 and a controllable slurry injector 62 to add a controlled quantity of slurry to the liquid sprayed from nozzles 55. Injector 62 receives inputs from logic and control system 60. The slurry source preferably comprises alkaline earth materials, such as hydrated lime, having a small particle size. Commercially available sources of fine dry hydrated lime may be produced by a variety of methods, such as those produced according to the method of U.S. Pat. No. 5,223,239, the disclosure of which is incorporated by reference. Commercially available sources of fine dry particles of hydrated lime commonly have particle sizes on the order of ten microns, and therefore have a relatively large surface area for chemical reactions. However, commercially available sources of dry particles of chemically active hydrated lime are comparatively expensive. Use of fine, dry hydrated lime particles present an added difficulty because they must be stored in an inert environment until use because of the high chemical reactivity of the hydrated lime. Specifically, atmospheric carbon dioxide readily reacts with hydrated lime to form calcium carbonate, according to the expression: $Ca(OH)_2+CO_2>CaCO_3(s)+H_2O$ (1). This reaction is undesirable because calcium carbonate is comparatively unreactive with acid-forming gases.

Slurry source 61 may comprise an in-line wet-grinder to convert slaked lime into a hydrated lime slurry with a controlled fine particle size. Pebble lime, which consists of coarse, marble-sized particles of CaO, is a comparatively inexpensive and widely available source of CaO. The pebble lime may be stored under atmospheric conditions until it is slaked and ground. Only a thin "skin" at the surface of the pebble lime is able to react with atmospheric carbon dioxide to form calcium carbonate. Once a protective skin has formed, the lime in the interior of the pebble retains its chemical reactivity until it is slaked and ground. Thus, on-site grinding of slaked lime or coarse hydrated lime offers an economical way to create the slurry source 61 of chemically reactive hydrated lime with a small particle size. Commercially available slakers, grinders, and classifiers are capable of economically producing large quantities of slaked, ground microfine particles having a controlled mean diameter in the range of about one micron to about twenty microns. Preferably, the lime is slaked and then ground in a wet grinding process such that the ground hydrated lime particles are not exposed to carbon dioxide or other atmospheric gases. As used herein, when referring to mean diameter particle diameter the reference is to the mean volume ("vmd") or mass diameter, which are approximately the same.

Preferably, the slurry is prepared substantially as needed using an in-line grinder to ensure the highest chemical reactivity of the ground hydrated lime particles in the slurry. If the slurry is not immediately used, it may be maintained in an inert ambient environment, such as a sealed or nitrogen purge storage tank. If the slurry is stored in an inert ambient environment, it may be stored for relatively short periods (e.g., less than 24 hours) without substantially decreasing its chemical reactivity.

As previously described, the spray from the nozzles 55 may be adjusted by logic and control system 60 to achieve the desired cooling function (e.g., reducing the gas temperature from approximately 400° C. to 150° C. for ESPs or 180° C. for FFBs for the mill-off condition). As is known, the total quantity of spray is kept as low as possible and the evaporative lifetime of the spray droplets is short. Preferably, the droplet size is adjusted such that the droplets completely evaporate just before the exit of the GCT. The mean lifetime of the spray droplets is thus, preferably, slightly less than the transit time of gases through the GCT. In one embodiment the spray is adjusted such that the largest spray droplets have a diameter of about 120 to 150 microns. The evaporative lifetime of a spray droplet in a modern GCT used in a cement plant is commonly about two to three seconds, although it may vary in the range of about one to five seconds. This is a relatively short time period for acidic gases to adsorb on to the surface of a droplet, be absorbed into the droplet, and react with calcium hydroxide released from the slurry particles in the droplet. Moreover, in order for the reaction to be rapid and efficient, the hydrated lime particles suspended in the spray droplets should substantially dissolve during the transit time of the droplet. According to the teachings of the '952 patent, the cooling spray of a GCT can be modified to efficiently scrub acidic forming gases using comparatively small amounts of an inexpensive alkaline earth material, such as a hydrated lime slurry. Thus, the spray liquid in a conventional GCT can be modified to efficiently scrub acid-forming gases.

In summary, in order for the spray to efficiently scrub the effluent the individual droplets should rapidly absorb pollutant gases and chemical agents added to the droplets should rapidly react with the gases before the droplets evaporate within the GCT. Additionally, chemical scrubbing agents and reacted products should otherwise be compatible with the economic operation of a cement plant. It is desirable that the cost of the chemical scrubbing agent should be low and the chemical scrubbing agent and reacted products not damage or clog pipes, valves, or fittings in the cement plant. It is also desirable that the scrubbing chemical not contaminate the feed meal or deleteriously alter the chemical balance of the feed meal.

Modern two-fluid nozzles, such as the MICROMIST™ nozzle, are capable of substantial control of median droplet size and with a narrow distribution in droplet size (by adjusting the compressed air pressure). The use of such nozzles facilitates an efficient scrubbing process because: 1) the initial surface-to-volume ratio of the droplets is large, such that the adsorption of gases is rapid; 2) each droplet has substantially the same initial diameter and hence substantially the same quantity of slurry particles, which facilitates uniform chemical reaction dynamics in the droplets; and 3) each droplet will have a similar size and, hence, lifetime in the GCT (typically one-to-five seconds). Again, the median droplet size is preferably adjusted such that the droplets evaporate near the exit of the GCT. A finely ground hydrated lime with a particle diameter in the range of one to 25 microns is highly chemically reactive, in large part because it has an extremely large surface area relative to its volume. The large surface-to-volume ratio of the hydrated lime particles increases the rate at which calcium hydroxide dissolves in the spray droplets. Decreasing the particle diameter of the hydrated lime particles substantially below 25 microns facilitates faster dissolution of the hydrated lime particles. The release of calcium hydroxide from the dissolving hydrated lime particles preferably occurs at a rapid enough rate that it does not limit the reaction that converts absorbed acidic gases into salts. For common GCT evaporative lifetimes of one to five seconds, the hydrated lime particles preferably have a diameter less than approximately ten microns such that the hydrated lime particles substantially dissolve in the spray droplets in the GCT before evaporation.

In cement plant applications a high pH spray is desirable because it reduces the solubility of ammonia in spray droplets. In cement plants the absorption of ammonia is undesirable, because ammonium sulfate salts are not thermally stable at common GCT temperatures (e.g., greater than 235° C.). Any ammonium sulfate formed in a droplet will decompose when the droplet evaporates, re-releasing ammonia and sulfur dioxide. This reduces the efficiency of the reactions that convert acidic gases into thermally stable salts. The efficiency of the scrubbing process thus increases when the quantity of lime slurry is increased such that the droplets retain a high pH during their evaporative lifetime in the GCT.

While spraying lime slurry into the GCT has proven to be an effective technique for reducing acid gas emissions from cement plants, the inventor has continued to investigate alternative methods for reducing such emissions, with the goal of improved efficiency and reliability. In some cases, a GCT is not needed during the mill on state, because effluent gases passing through the raw mill are sufficiently cooled. In such cases, use of the GCT spray incorporating lime particles to eliminate acid gases is not an option. In other cases, the volume of spray into the GCT during the mill on state may be too small for effective scrubbing.

As a result, in accordance with the present invention, the inventor has determined that substantial acid gas reductions can be achieved by spraying microfine lime particles directly into the raw mill during operation (i.e., during a mill on state). It is noted that the raw materials, such as limestone, typically used in cement production react with acid gases such as $SO_2$, such that effluent passing through the raw mill normally loses up to about half of acid gas content. However, this is insufficient to meet stringent limits on acid gas discharges. According to the present invention, the addition of fine lime particles in the raw mill, as described herein, can reduce the acid gas emissions to less than ~10 ppmv concentration.

FIG. 4 is a schematic representation of a system for spraying microfine lime into the raw mill of a cement plant in accordance with an embodiment of the present invention. Again, the same numbers are used to refer to common features shown the other figures. A nozzle system 65 for injecting a microfine lime slurry is positioned within the raw mill 20. Although one such nozzle is shown, nozzle system 65 may comprise a plurality of individual spray nozzles. In addition, the pollution control system preferably also comprises GCT 10, which can spray microfine lime into the effluent gas flow as described above. GCT 10 is used when the mill is off and may also be used at a reduced level when the mill is on to provide additional conditioning if necessary. In addition to regulating the spray in the GCT, control system 60 regulates the spray in the raw mill by controlling valve 64. In one embodiment, nozzle system 65 comprises one or more two-fluid nozzles as previously described. However, because nozzle system 65 will not typically to be used for cooling the effluent gas flow, it is not as important to carefully balance the droplet size and spray volume as within the GCT. Rather, the principal purpose of the spray from nozzle system 65 is to introduce microfine lime particles into the raw mill. It will be appreciated, however, that the reaction dynamics of acid gas scrubbing, as described above, is enhanced by using small droplets of the type that can easily be created by a two-fluid nozzle. In addition, it is generally not desirable to significantly cool the feed meal, and so the volume of water sprayed into the raw mill should be kept low. It is generally easier to create small droplets at low liquid flow volume using two fluid nozzles, especially when the nozzles are used to inject a high viscosity slurry. A further benefit of using two-fluid nozzles is that they make it easier to control the spray pattern.

Accordingly, pursuant to one embodiment of the present invention, a concentrated slurry of microfine is sprayed into the raw mill during the mill on state to scrub acid gases. The spray may have a concentration of up to approximately 40% by weight of hydrated lime, and is preferably about 25% by weight of hydrated lime. The viscosity and thixotropic properties of the slurry are highly dependent on the mean diameter, size distribution and shape of the lime particles and, therefore, the optimal concentration will depend on these factors, among others. Typically, the spray volume will be between about 1-20 gallons per minute (gpm), depending on the size and capacity of the raw mill and the moisture content of the feed meal. It is noted that the spray can serve as the grinding aid or lubricant for the raw mill, obviating the need to otherwise add water for this purpose. Generally, the microfine lime particles in the slurry should be as small as practical. However, like droplet size, particle size is not as critical as it is when spraying lime slurry into the GCT. Thus, where hydrated lime particles in the range of 2-6 μm vmd may be optimal for use in a GCT, particles as large as 10 μm vmd or more may be sufficiently small for use in the raw mill.

In an alternative embodiment, dry microfine lime particles may be injected into the gas flow in or before the raw mill. This can be done directly by spraying dry particles in or upstream of the raw mill. However, in accordance with an alternative embodiment of the invention, lime particles sprayed upstream of the raw mill should be added after the effluent gases have passed through the preheating tower where the high temperature can have undesirably effects. Preferably, if dry particles are injected into the gas flow upstream of the raw meal, they are sprayed in after the GCT. In a further embodiment, microfine lime can be added to the feed and transported with the feed to the raw mill.

The microfine lime particles that are sprayed into the raw mill act in three ways to reduce sulfur dioxide and other acid gas emissions. Initially, the slurry droplets directly scrub the effluent gases by adsorption on the surfaces of the droplets and reaction within them. Thereafter, the eventual evaporation of the water leaves dry lime kernels that are incorporated in the meal and are ground by the raw mill. Grinding the lime kernels exposes fresh, unreacted surface area to the effluent flow thereby scrubbing by adsorption on the surfaces of the kernels. Finally, some of the unreacted lime particles are entrained in the effluent gas flow, along with other fine particles from the raw meal, and are transported to the dust collector where they are captured in the filter cake. The lime particles continue to scrub acid forming gases as they are transported to the filter and while they are lodged in the filter cake. This process results in >80% capture of the sulfur dioxide entering the raw mill. Due to the grinding action, the circulation of gas in the mill, and the lower gas temperatures inside and after the raw mill (typically ≦110° C.), the utilization of injected microfine lime is very high; it is believed that nearly all of the injected lime reacts with acid forming gases. High $SO_2$ capture efficiency can occur when microfine lime is injected in the raw mill even at low molar stoichiometric ratios (1.05-1.5).

As noted, the injection of lime into the raw mill is only useful while the mill is in operation. According to a further aspect of the present invention, lime slurry is sprayed into the raw mill while the mill is in operation and into the GCT when the mill is down. Moreover, lime slurry may be sprayed into the GCT both when the mill is on or off, although the amount of spray will vary according to the state of the mill.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method of controlling emissions of acid forming gases from a pyroprocessing cement plant comprising a raw mill for processing feed meal used in cement production and a gas conditioning tower, wherein hot effluent gases from cement production are routed through the gas conditioning tower and to the raw mill to heat the feed meal, comprising: spraying microfine hydrated lime into the effluent gases after the effluent gases have passed through the gas conditioning tower when the raw mill is in operation.

2. The method of claim 1 wherein the spray is a water-based slurry injected into the raw mill.

3. The method of claim 1 wherein the spray is a dry powder.

4. The method of claim 1 further comprising spraying a water-based slurry of microfine hydrated lime into the hot effluent gases in the gas conditioning tower when the raw mill is not in operation.

5. The method of claim 4 further comprising also spraying the water-based slurry of microfine hydrated lime into the hot effluent gases in the gas conditioning tower when the raw mill is in operation.

6. The method of claim 2 further comprising using a two-fluid nozzle to create the spray.

7. The method of claim 1 where the microfine lime consists substantially of particles having a mean diameter of about 10 microns or less.

8. The method of claim 2 wherein the hydrated microfine lime in said spray comprises about 25% by weight.

9. The method of claim 3 wherein the dry powder is sprayed into the raw mill.

10. The method of claim 3 wherein the dry powder is sprayed into the gas flow upstream of the raw mill and downstream of the gas conditioning tower.

11. A method of controlling acid gas emissions from a cement plant comprising a raw mill for grinding raw materials to produce a feed meal used in cement production, a pyroprocessing chamber for processing the feed meal at high temperature, and a gas conditioning tower, wherein effluent gases from the pyroprocessing chamber are routed through said raw mill to heat and dry the feed meal when the raw mill is in operation, and wherein the effluent gases are also routed through said gas conditioning tower, comprising:
spraying microfine lime into said raw mill when said raw mill is in operation,
spraying microfine lime into said gas conditioning tower when said raw mill is not in operation, and
removing dust from said effluent gases downstream of said gas conditioning tower and said raw mill prior to discharging said effluent gases into the atmosphere.

* * * * *